(12) United States Patent
Ji et al.

(10) Patent No.: US 9,949,247 B2
(45) Date of Patent: Apr. 17, 2018

(54) METHOD AND APPARATUS FOR CONFIGURING CONTROL CHANNEL RESOURCES IN COMMUNICATION SYSTEM

(71) Applicant: SAMSUNG ELECTRONICS CO., LTD., Gyeonggi-do (KR)

(72) Inventors: Hyoung Ju Ji, Seoul (KR); Youn Sun Kim, Seongnam-si (KR); Joon Young Cho, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 226 days.

(21) Appl. No.: 14/429,328

(22) PCT Filed: Sep. 16, 2013

(86) PCT No.: PCT/KR2013/008344
§ 371 (c)(1),
(2) Date: Mar. 18, 2015

(87) PCT Pub. No.: WO2014/046430
PCT Pub. Date: Mar. 27, 2014

(65) Prior Publication Data
US 2015/0237605 A1 Aug. 20, 2015

(30) Foreign Application Priority Data
Sep. 18, 2012 (KR) .................. 10-2012-0103430

(51) Int. Cl.
*H04W 72/04* (2009.01)
*H04L 25/02* (2006.01)
*H04L 5/00* (2006.01)

(52) U.S. Cl.
CPC ......... *H04W 72/042* (2013.01); *H04L 5/0007* (2013.01); *H04L 5/0051* (2013.01); *H04L 25/0224* (2013.01)

(58) Field of Classification Search
CPC ... H04L 5/0053; H04L 5/0051; H04L 5/0048; H04L 5/0007; H04L 25/0226;
(Continued)

(56) References Cited

U.S. PATENT DOCUMENTS 9,641,300 B2 * 5/2017 Wu ..................... H04L 5/0048
2013/0114521 A1 * 5/2013 Frenne .................. H04L 5/0053
370/329

(Continued)

OTHER PUBLICATIONS

International Search Report dated Jan. 9, 2014 in connection with International Patent Application No. PCT/KR2013/008344, 7 pages.
(Continued)

*Primary Examiner* — Hoang-Chuong Vu

(57) ABSTRACT

A method and an apparatus for configuring a control channel in a communication system, according to the present invention, allocate resources of different sizes according to a distributed transmission mode and a localized transmission mode and apply different antenna transmission techniques, to a control channel on the basis of frequency division. In addition, the present invention relates to a method by which a terminal estimates a channel irrespective of the transmission mode. According to the present invention, a control channel transmitted to different terminals from a base station can be efficiently multiplexed and the control channel be received faster by reducing the complexity of the terminal.

23 Claims, 17 Drawing Sheets

(58) Field of Classification Search
CPC .......... H04L 25/0232; H04L 25/0224; H04W 72/042; H04W 88/08; H04W 48/12; H04W 72/0446; H04W 74/006
See application file for complete search history.

(56) References Cited

U.S. PATENT DOCUMENTS

| | | | | |
|---|---|---|---|---|
| 2013/0194931 | A1* | 8/2013 | Lee | H04L 5/0053 370/241 |
| 2013/0272214 | A1* | 10/2013 | Zhu | H04W 28/02 370/329 |
| 2013/0286980 | A1* | 10/2013 | Liao | H04W 72/042 370/329 |
| 2013/0294368 | A1* | 11/2013 | Bendlin | H04W 72/042 370/329 |
| 2013/0301562 | A1* | 11/2013 | Liao | H04W 72/042 370/329 |
| 2014/0044062 | A1* | 2/2014 | Ye | H04W 72/0453 370/329 |
| 2014/0056279 | A1* | 2/2014 | Chen | H04W 52/04 370/330 |
| 2014/0071934 | A1* | 3/2014 | Frenne | H04L 5/001 370/330 |
| 2014/0307700 | A1* | 10/2014 | Seo | H04L 5/0053 370/329 |
| 2014/0314038 | A1* | 10/2014 | Seo | H04L 5/0023 370/329 |
| 2015/0036616 | A1* | 2/2015 | Lee | H04L 5/0023 370/329 |
| 2015/0063236 | A1* | 3/2015 | Seo | H04W 12/00 370/329 |
| 2015/0092728 | A1* | 4/2015 | Wang | H04L 5/0048 370/329 |
| 2015/0103800 | A1* | 4/2015 | Seo | H04W 56/00 370/330 |
| 2015/0146672 | A1* | 5/2015 | Wu | H04W 72/04 370/329 |

OTHER PUBLICATIONS

Written Opinion of International Searching Authority dated Jan. 9, 2014 in connection with International Patent Application No. PCT/KR2013/008344, 8 pages.
Alcatel-Lucent Shanghai Bell, "Multiplexing of Localized and Distributed ePDCCH in Same PRBs", 3GPP TSG RAN WG1 Meeting #69, Prague, Czech Republic, May 21-25, 2012, 3 pages.
Samsung, "Association Between Antenna Ports and ePDCCH Transmissions", R1-122249, May 21-25, 2012, 6 pages.
China Unicom, "Consideration on Multiplexing of Localized and Distributed ePDCCH", R-122380, 3GPP TSG RAN WG1 Meeting #69, Prague, Czech Republic, May 21-25, 2012, 2 pages.
Nokia, et al., "Control Channel Region for ePDCCH", R1-122427, 3GPP TSG RAN WG1 Meeting #69, Prague, Czech Republic, May 21-25, 2012, 3 pages.
Sharp, "DMRS Port Determination for ePDCCH", R1-122387, 3GPP TSG RAN WG1 Meeting #69, Prague, Czech Republic, May 21-25, 2012, 7 pages.

* cited by examiner

FIG. 7

METHOD AND APPARATUS FOR CONFIGURING CONTROL CHANNEL RESOURCES IN COMMUNICATION SYSTEM

CROSS-REFERENCE TO RELATED APPLICATION(S)

The present application claims priority under 35 U.S.C. § 365 to International Patent Application No. PCT/KR2013/008344 filed Sep. 16, 2013, entitled "METHOD AND APPARATUS FOR CONFIGURING CONTROL CHANNEL RESOURCES IN COMMUNICATION SYSTEM". International Patent Application No. PCT/KR2013/008344 claims priority under 35 U.S.C. § 365 and/or 35 U.S.C. § 119(a) to Korean Patent Application No. 10-2012-0103430 filed Sep. 18, 2012, which are incorporated herein by reference into the present disclosure as if fully set forth herein.

TECHNICAL FIELD

The present invention relates to a method and apparatus for configuring control channel resource in a communication system. In particular, the present invention relates to a resource allocation method for configuring control channel transmission resource based on the terminal-specific reference signal and transmitting the control channel to the terminal efficiently.

BACKGROUND ART

Mobile communication systems were developed to provide mobile users with communication services. With the rapid advance of technologies, the mobile communication systems have evolved to the level capable of providing high speed data communication service beyond the early voice-oriented services.

Recently, standardization for a Long Term Evolution (LTE) system, as one of the next-generation mobile communication systems, is underway in the 3$^{rd}$ Generation Partnership Project (3GPP). LTE is a technology for realizing high-speed packet-based communications with the data rate of up to 100 Mbps, which is higher than the currently available data rate, and its standardization is almost complete. In line with the completion of the standardization of LTE, the discussion focus is shifted to LTE-Advanced (LTE-A) for increasing the data rate by adopting new technologies. The term 'LTE system" as used herein may be construed to include the legacy LTE system and the LTE-A system.

DISCLOSURE OF INVENTION

Technical Problem

Typically, the control channel is transmitted using the common reference signal in a distributed transmission scheme to guarantee the reception performance of the terminal. However, the newly proposed control channel is transmitted through a terminal-specific reference signal in various transmission schemes. In this case, it is necessary for the terminal to support various transmission modes for performing channel estimation and control channel multiplexing based on different terminal-specific reference signals to receive the new control channel.

At this time, as the number of channel estimation requirements increases, the reception complexity increases and, as a consequence, this increases the channel reception time and decreases the data channel demodulation time, resulting in degradation of terminal performance.

Solution to Problem

In order to solve the above problems, the present invention proposes a control channel resource configuration method and apparatus that is capable of supporting both the diversity and localized transmission modes for control channel transmission with a newly proposed resource allocation scheme.

In order to accomplish this, the present invention includes receiving a plurality of sets of physical resource blocks for receiving a control channel and receiving transmission modes of respective sets. The present invention includes a method of defining Distributed enhanced Resource Element Groups (DeREGs) having same size in Physical Resource Block (PRB) for distributed transmission. The present invention includes a method of determining to map DeREGs and DMRS and configuring Localized enhanced Control Channel Element (LeCCE) as control channel unit for localized transmission by aggregating resources using same dedicated reference signals in the dedicated reference signal mapped for DeREG in the PRB.

The terminal is capable of estimating control channels using the same channel estimator regardless of the transmission mode of the physical resource block transmitted on the control channel and receiving the different transmission modes in a plurality of physical resource blocks dynamically in adaptation to the channel of the terminal without increase of terminal complexity.

In order to solve the above problems, the present invention includes a controller for configuring resources according to a control channel mode and determining dedicated reference signals used per resource and a channel estimator based on the resource allocation method proposed in the present invention.

Also, the present invention proposes a control channel resource structure for multiplexing the control channels of different transmission modes into one resource region.

Advantageous Effects of Invention

The present invention is advantageous in terms of estimating channels using dedicated reference signals regardless of the control channel mode so as to guarantee the channel estimation performance. The resource allocation structure of the present invention is advantageous in terms of maintaining the same control channel demodulation complexity according to the transmission mode.

The proposed technology is advantageous in terms of receiving the control channels of a plurality of transmission modes using one dedicated reference signal estimator regardless of the control channel mode of the terminal so as to reduce the terminal complexity. Also, it is advantageous in terms of multiplexing different transmission modes into one resource region so as to increase resource efficiency.

BRIEF DESCRIPTION OF DRAWINGS

FIG. 7 is a diagram illustrating a resource allocation structure according to the control channel transmission mode proposed by the present invention.

MODE FOR THE INVENTION

Detailed description of well-known functions and structures incorporated herein may be omitted to avoid obscuring the subject matter of the present invention. Exemplary embodiments of the present invention are described with reference to the accompanying drawings in detail.

The present invention relates to a communication system in which a base station transmits a downlink signal to a terminal and the terminal transmits an uplink signal to the base station. The downlink signal includes data channels carrying the information transmitted to the terminal, control channels carrying control information, and Reference Signals (RSs) for channel estimation and channel feedback. The base station transmits the data and control information to the terminal through Physical Downlink Shared Channel (PDSCH) and Downlink Control Channel (DL CCH). The uplink signal also includes data and control channels and reference signals, the data being transmitted on Physical Uplink Shared Channel (PUSCH) and the control information on Physical Uplink Control Channel (PUCCH).

Figure 1:
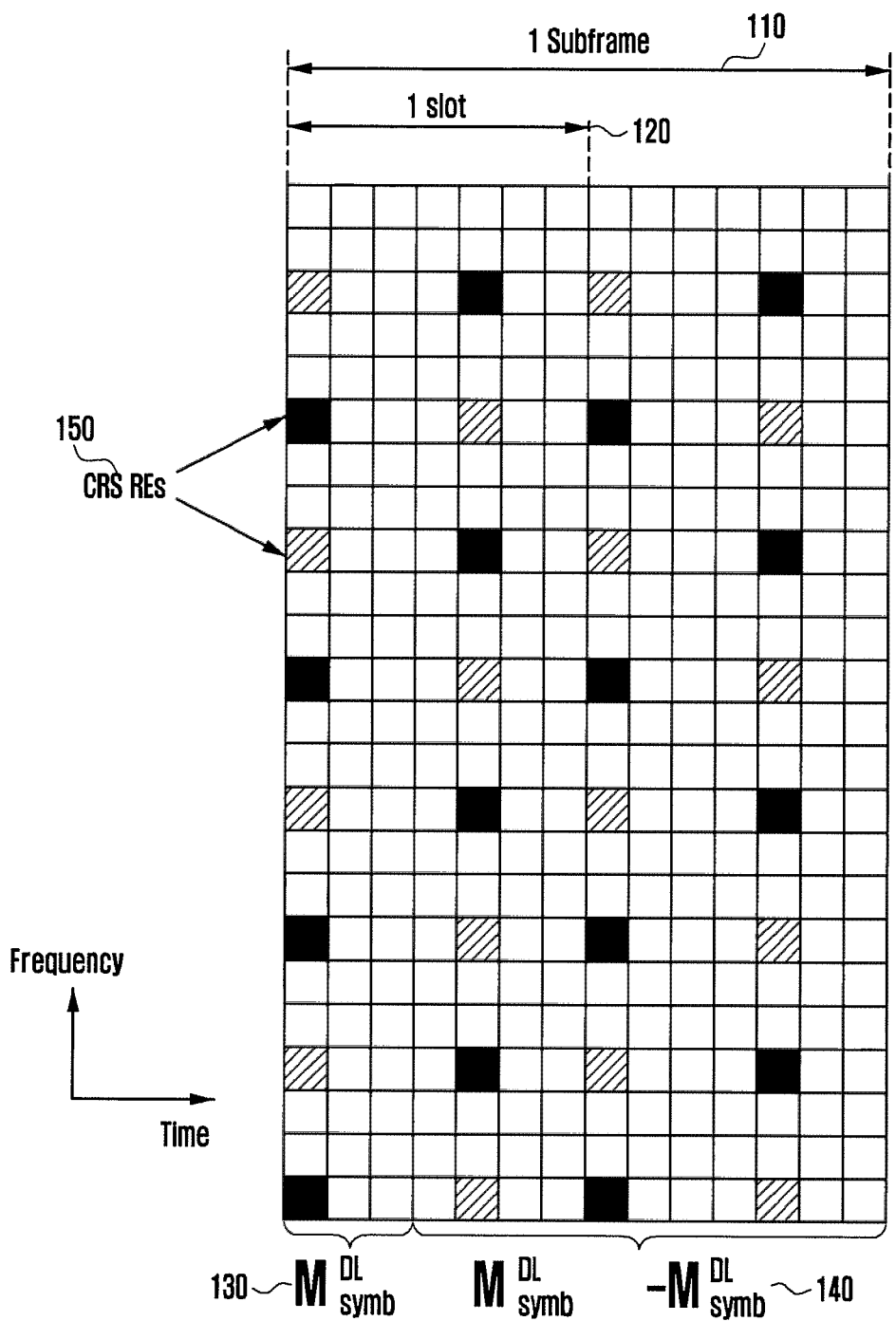
FIG. 1 is a diagram illustrating a structure of an LTE system to which the present invention is applied.

The base station transmits various types of reference signals including Common Reference Signal (CRS), Channel State Information Reference Signal (CSI-RS), and Demodulation Reference Signal (DMRS). The CRS is transmitted across the entire downlink band for use in signal demodulation and channel estimation at all the terminals within the cell. In order to reduce the resource for CRS transmission, the base station transmits DMRS as a terminal-specific reference signal on the resource and the CSI-RS on time and frequency axes for acquiring channel information FIG. 1 is a diagram illustrating a structure of a downlink subframe. The minimum scheduling unit of the base station is subframe 110 which consists of two slots 120 and $N_{symb}^{DL}$ symbols to transmit control and data channels and reference signals. $M_{symb}^{DL}$ symbols at the beginning of the subframe are used for transmitting the control channel 130, and the remaining symbols $N_{symb}^{DL}-M_{symb}^{DL}$ are used for transmitting the data channel 140. The transmission bandwidth consists of Resource Blocks (RBs) on the frequency axis, each RB consists of $N_{sc}^{RB}$ subcarriers or Resource Elements (REs), two slots and one RB unit on the time axis are referred to as PRB pair. One PRB pair carries CRS 150, CSI-RS, and DMRS.

Downlink Control Information (DCI) is transmitted to the terminal for various purposes, some for downlink or uplink data channel scheduling and some for system information delivery, initial attachment, and paging. Some other DCIs are transmitted for power control of the terminal.

A DCI format includes Cyclic Redundancy Check (CRC) bits for the terminal to identify the DCI addressed to it. The CRC of the DCI is scrambled by a Radio Network Temporary Identifier (RNTI) which the base station allocates to the terminal, i.e. Cell RNTI for use in scheduling the terminal. There are various kinds of RNTIs, i.e. RNTI for system information transmission, RNTI for initial attachment, and RNTI for paging.

Figure 2:
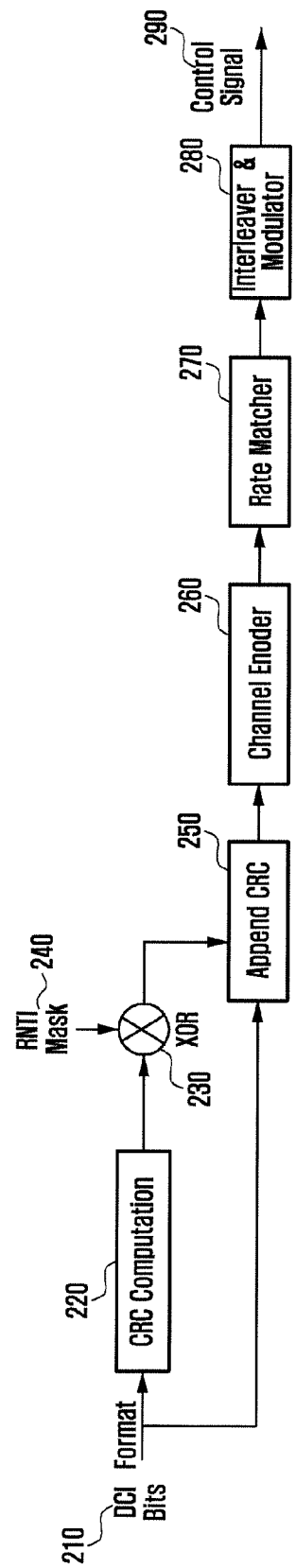
FIG. 2 is a diagram illustrating a control channel transmission process of the LTE system to which the present invention is applied.

FIG. 2 is a diagram illustrating an encoding process of a base station to transmit DCI. Referring to FIG. 2, the base station configures the DCI at stage 210 and calculates CRS based on the transmission information at stage 220. Next, the base station scrambles the CRS with the RNTI. The scramble operation is bit-unit XOR operation. Next, the base station concatenates the scrambled CRC 250 to the original DCI information. Next, the base station performs channel coding at step 260 and determines the code rate in adaptation to the transmission resource at stage 270. Next, the base station converts the information to the transmission signal by means of the interleaver and modulator 280 and transmits the signal through the PDCCH at stage 290.

Figure 3:
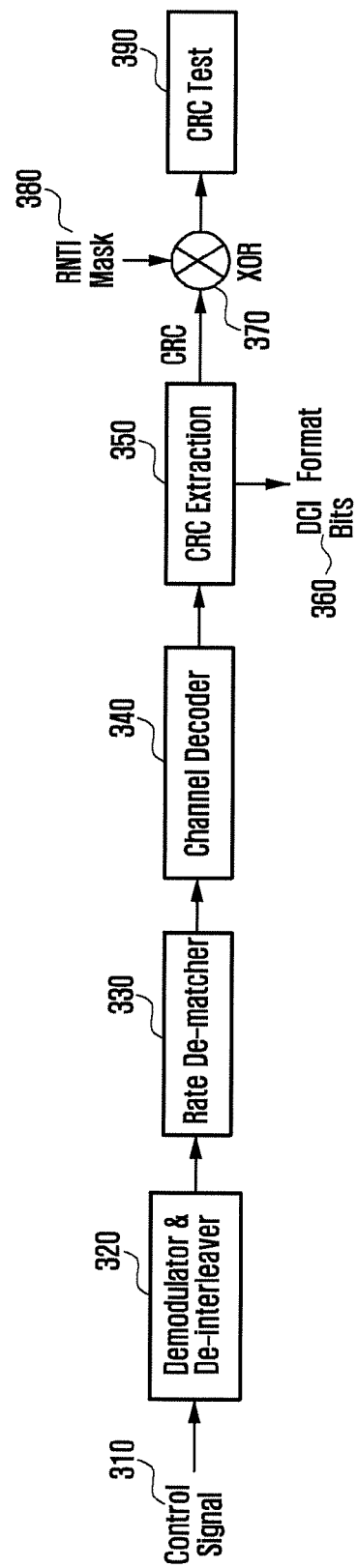
FIG. 3 is a diagram illustrating a control channel reception procedure of the LTE system to which the present invention is applied.

FIG. 3 is a diagram illustrating a control channel reception process of a terminal. Referring to FIG. 3, the terminal receives a control channel 310 and identifies the control channel transmitted to it by means of the demodulator and inverse interleaver 320. The terminal sends the information to the channel decoder 350 in consideration of the code rate and extracts the CRS 350. In this state, the terminal determines whether the control channel is addressed to it and identifies the information field of the DCI simultaneously. The terminal is capable of identifying the control channel addressed it by performing exclusive OR (XOR) on the RNTI at stage 370 and check the CRC at stage 390.

The base station transmits the DCIs through respective PDCCHs. In order to overlap between the control channels, the terminal and the base station share the information on the negotiated region such that the base station arranges the control channel in the corresponding region and the terminal performs blind decoding at the position designated for the control channel in the region to identify its own control channel. The region designated for the terminal is defined as the region of logical Control Channel Element (CCE) unit, and the CCEs of the control channel are aggregated to be transmitted. The aggregation is a method of defining the code rate of the control channel and thus the higher the aggregation level is, the lower the guaranteed code rate is. The PDCCHs are aggregated at aggregation levels of 1, 2, 4, and 8 CCEs.

Figure 4:
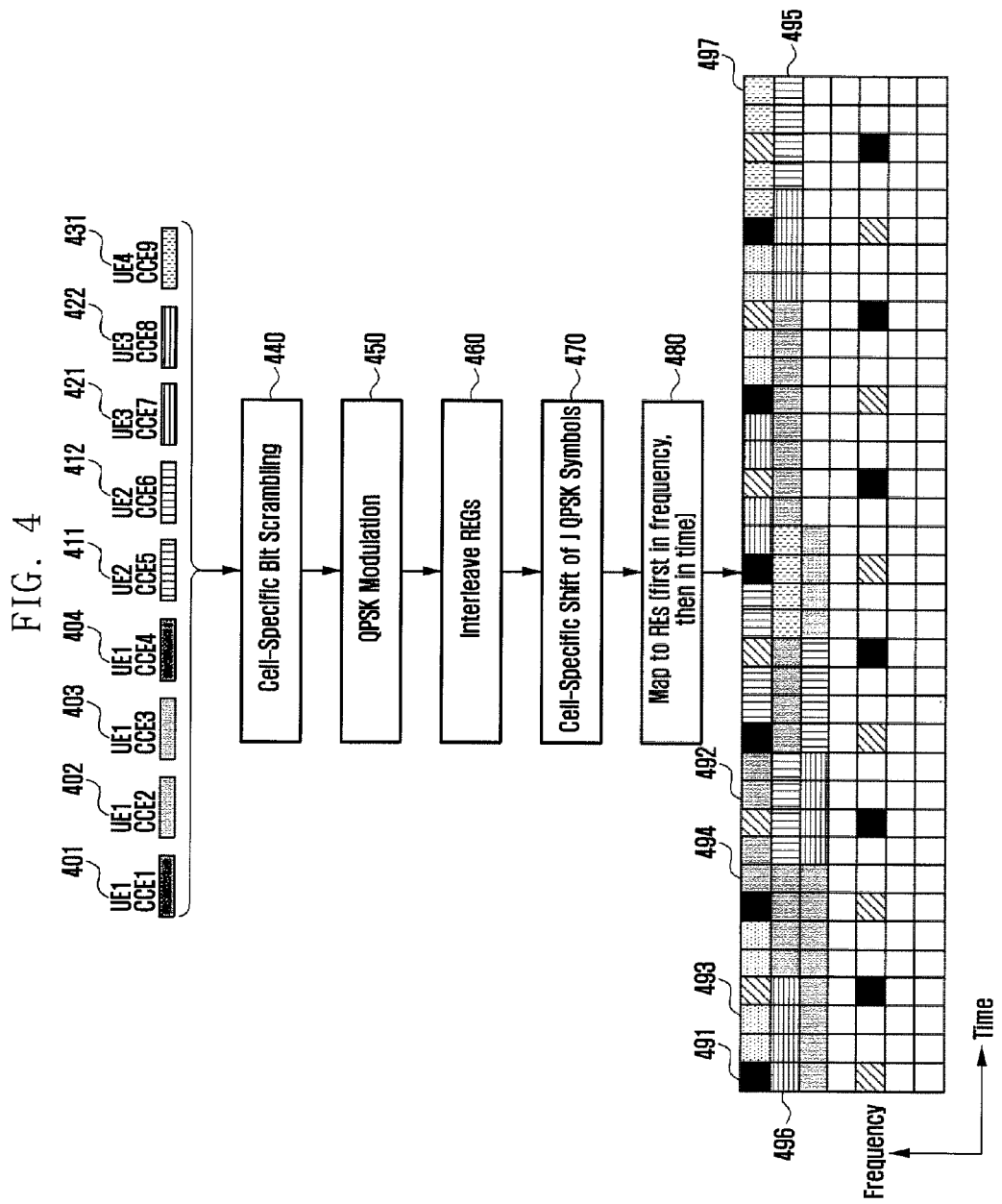
FIG. 4 is a diagram illustrating a control channel multiplexing process of the LTE system to which the present invention is applied.

FIG. 4 is a diagram illustrating a process of transmitting DCI through PDCCH. Referring to FIG. 4, the encoded DCI is mapped to the CCE region as a logical resource region. For example, the CCEs 401, 402, 403, and 404 are used for transmission to the terminal 1 at aggregation level 4, and the next 2 CCEs 411 and 412 are used for transmission to the terminal 2 at aggregation level 2.

Another two CCEs 421 and 422 are used for transmission to the terminal 3 and the remaining CCE 431 to terminal 4. The base station concatenates the DCIs of the terminals that are transmitted at the current subframe and scrambles the whole control channel through cell-specific scrambling 440. This is to avoid inter-base station interference. Afterward, the base station modulates the control channel through the QPSK modulation scheme as denoted by reference number 450 and performs interleaving as denoted by reference number 460.

The REG is comprised of 4 REs and used as a unit of control channel interleaving and resource mapping. The interleaved control channel is cyclic-shifted using a cell-specific offset. The cyclic shift 470 is performed in unit of REG. Next, each REG is mapped to the subframe as denoted by reference number 480. The interleaved control channels 494, 495, 496, and 497 are transmitted to the respective terminal 1, terminal 2, terminal 3, and terminal 4.

In the control channel demodulation process of the terminal, a search space concept is introduced for the terminal to receive the control channel at valid control channel transmission position.

The control channel region is divided into a common search space region in which the control channel (such as system information, paging, and power control command) is transmitted and a UE-specific search region in which the UE-specific control channel is transmitted. The scheduling information is transmitted in this region. The search space of the control channel is configured according to a random generator between the base station and the terminal as shown in FIG. 1.

$$\text{CCE index of search space} = L \cdot \{(Y_k + m) \bmod [N_{CCE,k}/L]\} + i \text{ where } i=0, \ldots, L-1 \text{ and } m=0, \ldots, M_C^{(L)} - 1 \quad (1)$$

$N_{CCE,k}$ denotes the total number of CCEs available in subframe K, and $M_C^{(L)}$ denotes the number of candidates that can be transmitted at aggregation level L. In the case of UE-specific control channel, the number of candidate search spaces at aggregation level $L \in \{1,2,4,8\}$ is $\{6, 6, 2, 2\}$ and determined by the variable $Y_k = (A \cdot Y_{k-1}) \bmod D$ equation (1), and the initial value is $Y_{-1} = C\text{-RNTI} \neq 0$ the terminal-specific region and $Y_k = 0$ for the common control channel.

Typically, the control channel (CCH) is distributed across the entire downlink band and transmitted on up to 3 symbols at the beginning of the subframe. In this structure, if the CCH amount is insufficient, this causes control channel capacity shortage and thus performance degradation or, if interference control is required on the frequency axis, this causes performance degradation, resulting in control channel reception failure.

If there is Remote Radio Heads (RRHs) within the cell and the RRHs have the same cell identifier (ID) as the base station, the cell is not separated so as to cause control channel capacity shortage. In another example, if there are a lot of base station using the same frequency in the same area like a heterogeneous network, the control channel interference increases and thus it is necessary to separate in time domain and this also causes control channel capacity reduction.

The simplest way of increasing the control channel capacity is to increase the number of time symbols of the control channel but, since the legacy terminal does not support such a structure, it is impossible to increase the number of symbols. It is possible to design a control channel in such a way of increasing the control channel resource by using part of the data channel as control channel, and such a control channel is referred to as enhanced CCH (eCCH or ePDCCH).

Figure 5:
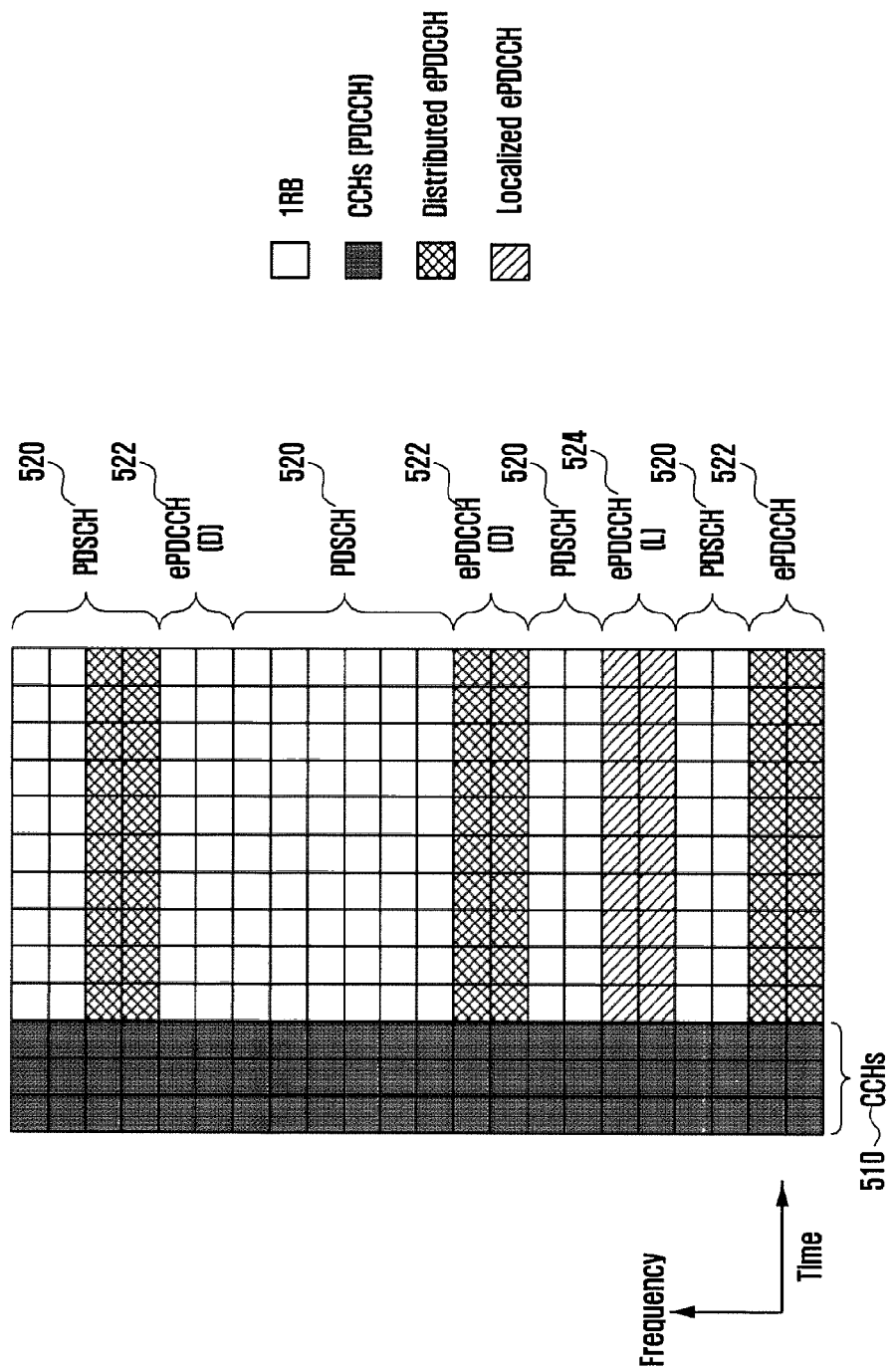
FIG. 5 is a diagram illustrating a control channel transmission mode to which the present invention is applied.

FIG. 5 is a diagram illustrating a resource allocation method of ePDCCH. Referring to FIG. 5, the legacy control channel is transmitted across the entire downlink band at the beginning of the subframe as denoted by reference number 510, and the data channel is transmitted on the remaining region as denoted by reference number 520. In the case of ePDCCH, two transmission modes can be used: one is distributed transmission mode and the other is localized transmission mode. In the case of the distributed transmission mode, some PRBs being used for data channel are allocated as frequency distribution resource as denoted by reference number 522.

This is a method for a high mobility terminal or a terminal with poor channel state to perform transmission with the guarantee of average channel characteristic of multiple frequency bands such that the PRBs selected across the entire downlink band are used for transmission as denoted by reference number 522.

The localized transmission mode as another ePDCCH transmission method is to use the frequency selective channel. In the case of the low mobility terminal or fixed terminal has a frequency band of good quality and such channel characteristic is maintained a certain time duration.

Accordingly, if the transmission is performed on the best channel per terminal, it is possible to transmit data using the resource as small as possible due to the good channel characteristic and thus, if this is used for the control channel, it is possible to save the resource for control channel transmission and multiplex the terminals located at different areas or having different channel characteristics on the same PRB resource. Such a transmission mode is a method of transmitting control information on part of the entire downlink band as denoted by reference number 524.

Figure 6:
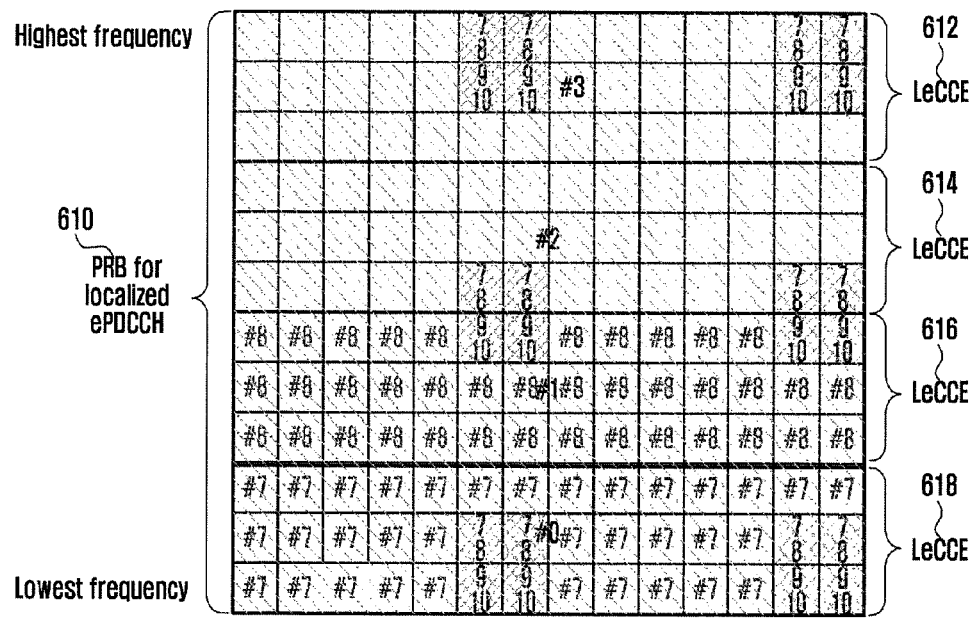
FIG. 6 is a diagram illustrating a multiple antenna transmission method according to the control channel transmission mode to which the present invention is applied.
Figure 6:
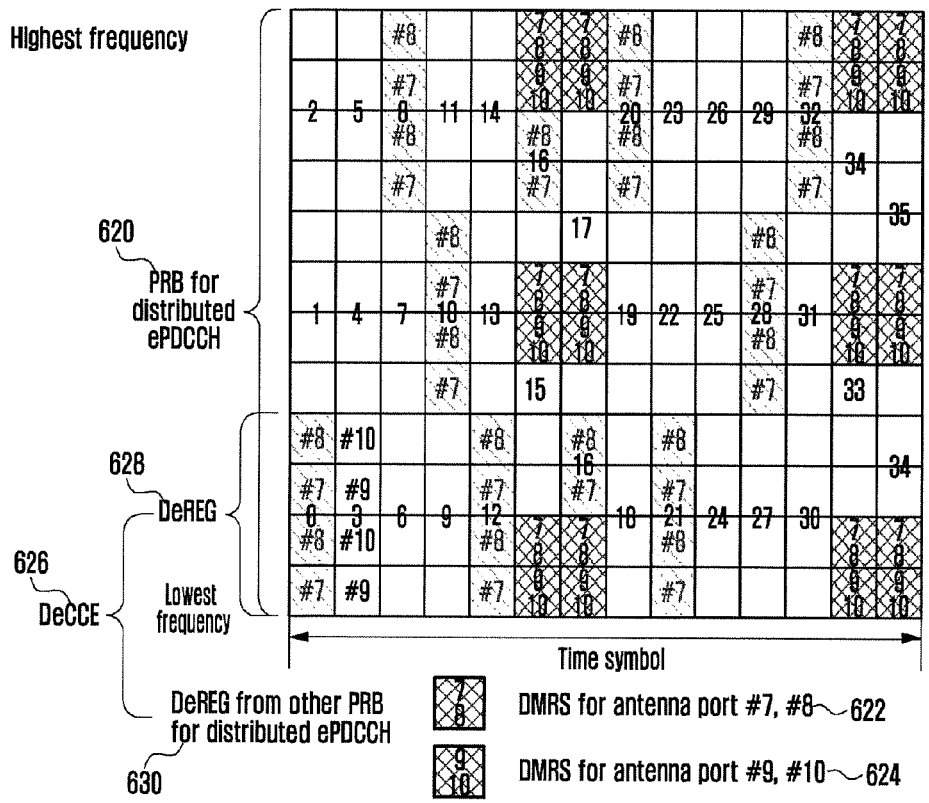

FIG. 6 is a diagram illustrating resource allocation method of the two transmission modes of ePDCCH. Referring to FIG. 6, part 610 shows an example of the localized transmission method, and part 620 shows an example of the distributed transmission method.

In the case of the localized transmission method, since a specific frequency region is used, the channel consecutive on the frequency and time axes is the best channel in view of the channel characteristic. In the case that total four LeCCEs 612, 614, 616, and 618 can be configured on one PRB as shown in part 610 in order to guarantee such characteristic, it is possible to allocate the LeCCEs frequency-selectively or one PRB may be allocated spritely on four frequency bands.

In the case of the localized transmission, one ePDCCH may be configured with a plurality LeCCEs but one LeCCE has to be transmitted on one PRB. In order to guarantee the 1 LeCCE channel as the smallest resource allocation unit for channel estimation of each LeCCE, it is possible to use four DMRSs 622 and 624 and it is possible to configure such that each LeCCE uses at least one DMRS port as shown in part 610.

For example, LeCCE#0, LeCCE#1, LeCCE#2, and LeCCE#3 may use port 7, port 8, port 9, and port 10, respectively.

The terminal estimates a channel based on the DMRS port used for receiving the LCCEs to receive its control channel. If the terminal can estimate the ports 7 and 8, it can receive LeCCE#0 and LeCCE#1.

In the case of the distributed transmission, one ePDCCH may be comprised of five DeCCEs 626, one DeCCE 626 has to be distributed across two or more preconfigured PRBs 620 for transmission, the distribution is done in unit of DeREG 628 and 630, and two DMRS ports 622 and 624 are inevitable to receive one ePDCCH.

In the case that one DeREG is configured as denoted by reference number 628 as shown in part 620, since the DeCCE 616 including the DeREG 628 is determined based on the DeREGs existing in preconfigured PRBs and one DeREG 628 is received using two DMRSs, the DMRS ports 7 and 8 622 are used for estimating respective REs.

This transmission method is used for receiving one inter-antenna control channel and guarantee the antenna diversity performance. Accordingly, the DeREG 628 in on ePRB 620 has to define two antennas used for transmitting the respective DMRS ports. The terminal estimates the channel using the corresponding antenna ports for receiving respective DeREGs based thereon.

The base station notifies the UE of a plurality ePDCCH transmission group through higher layer signaling which includes the transmission modes of the respective transmission groups and used PRB positions. The groups may be indicated at the PRB positions that are different, overlapped partially, or identical, e.g. PRB #0 being included in the distributed transmission mode resource of one transmission group and simultaneously in another transmission group of the localized transmission mode.

The terminal having the plural ePDCCH transmission groups distributes its search space across the plural groups to receive the ePDCCH and thus receive both the distributed and localized control channels on the same PRB according to the configuration information. The ePDCCH transmission group may be configured identically for different terminals. It is possible to notify a terminal of the use of PRB #0 for distributed transmission and another terminal of the use of the corresponding PRB for localized transmission. In this case, the corresponding PRB is used for one transmission mode from the viewpoint of the terminal but both or one of the distributed and localized transmission mode control channels can be transmitted selectively on one PRB from the viewpoint of the base station.

At this time, if the configuration informations of ePDCCHs using different transmission modes have overlapped PRB or it is necessary to receive in both the different transmission modes, the terminal has to select a channel estimator according to the transmission mode as shown in FIG. 6.

In the case that the localized transmission mode has to be tried, the antenna port suitable for LeCCE and the channel estimator optimized at the LeCCE location are used as shown in part 610; and in the case that the distributed transmission mode has to be tried, the channel estimator optimized for receiving DeREG is used as shown in part 620. In this case, the reception complexity of the terminal becomes two fold, the terminal has to have the channel estimators for the respective control channel transmission modes to be attempted. From the viewpoint of the base station, when different terminals perform transmission on the same PRB, it is easy to multiplex the transmissions in the same transmission mode but difficult to multiplex the transmission in different transmission modes.

The present invention proposes the structures of LeCCE and De REG as the resource unit for receiving all the types of ePDCCHs using one channel estimator optimized independently of ePDCCH transmission and defines the relationship between resource units and DMRS port. The proposed method is capable of multiplexing a plurality ePDCCHs into one PRB even when the base station use different antenna transmission schemes of different transmission modes.

Figure 7:
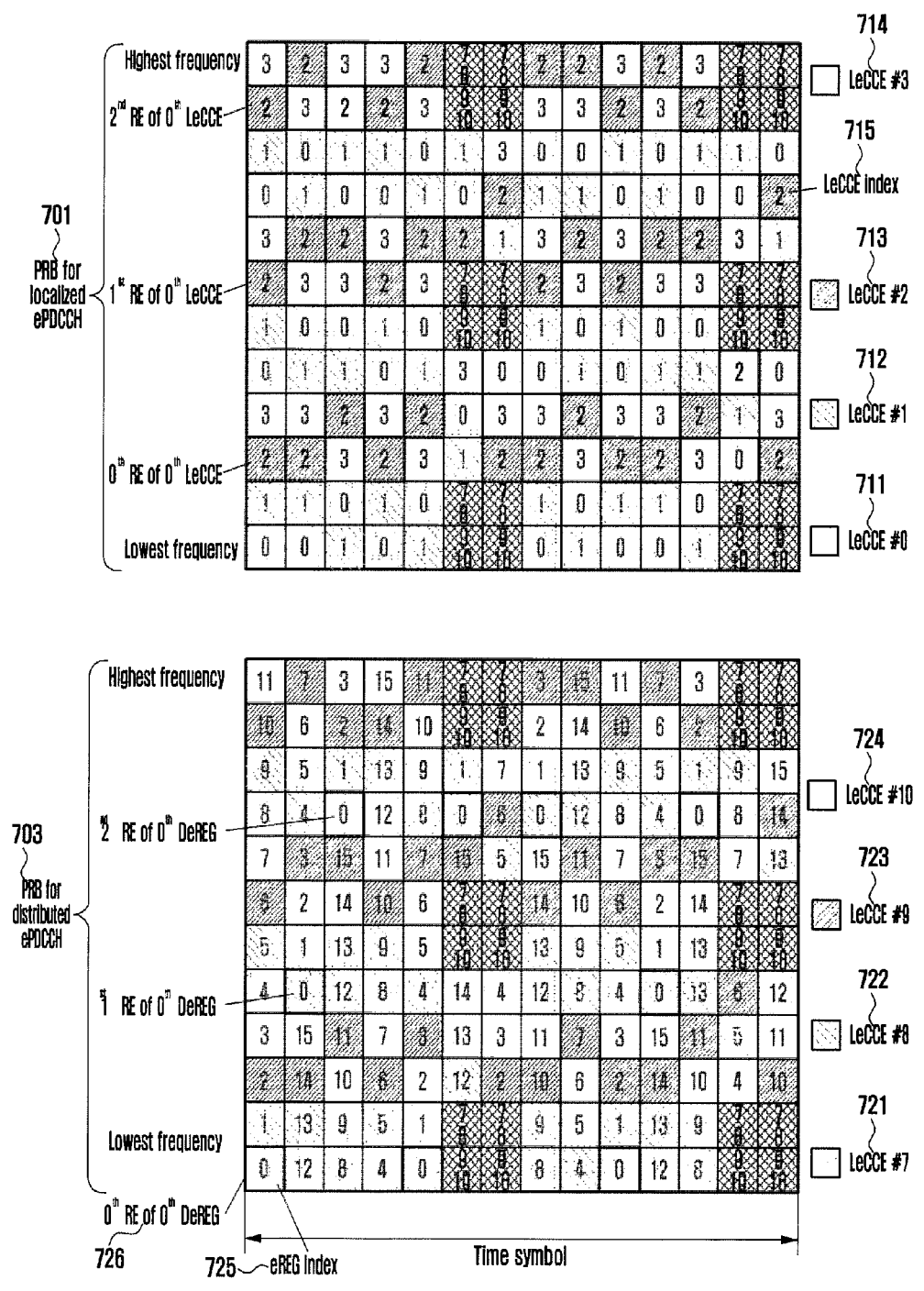

FIG. 7 is a diagram illustrating the proposed resource configuration method. The proposed resource configuration method configures DeREGs of the same size in one PRB and maps two DMRSs to the REs of the DeREG for antenna diversity of the DeREG, at this time, the REs using the same DMRS, among the DMRSs mapped for DeREG transmission in the PRB, being collected for configuring the Localized enhanced control channel elements (LeCCEs) as control channel unit for localized transmission.

Referring to FIG. 7, part 703 shows a transmission resource configuration and DMRS transmission method in the PRB supporting the proposed distributed transmission mode, part 701 shows the resource allocation method in the proposed localized transmission mode.

The ePDCCH can be transmitted in differently structure subframes for which available resource among and number of available DMRS ports are defined. Table 1 shows the number of eREGs according to the number of antenna ports and available resource amount depending on the subframe structure.

For example, in the case of the normal subframe having the normal CP, total 4 DMRS ports can be used for the corresponding PRB, and the resource amount corresponding to up to 4 DeREGs can be used for eCCE.

In the case of the normal subframe having the extended CP, it has a small number of available symbols, i.e. two DMRS ports are available, and the resource amount corresponding to 8 DeREGs can be used for eCCE.

At this time, the resource amount per DeREG corresponds to the value obtained by dividing the number of maximum available REs with the exception of the resource allocated for DMRS in the PRB by the number of DeREGs per PRB and, since the corresponding REs are not used when overlapped with other channels such as CRS and PDCCH, DeREGs have resources different in number. The subframes may be sorted into cases A, B, and C depending on the number of antenna ports and available resource and configured by reference table 1. In the following description, the subframes are sorted into cases.

Table 2 shows the relationship between the proposed DeREG resource for the distributed transmission mode and the DMRS used therein. The DeREGs configured in one PRB may be divided into two DeREG sets different depending on the case. In Case A where 4 DMRSs are available per PRB, the DeREGs can be divided into two sets without overlap, one for receiving through DMRS ports 7 and 8 and the other for receiving DMRS ports 9 and 10.

In the case that the terminal can receive only up to 2 DMRSs for ePDCCH, if one of the DeREG sets 1 and 2 is received in the corresponding PRB or if time is sufficient, the terminal receives the DeREG set 1 first and then the DeREG set 2. In another method, if the terminal can receive only up to 2 antenna ports, the terminal may receive the DMRS ports 7 and 8 instead of the DMRS ports 9 and 10 for DeREG set 2.

In Case B where 4 DMRS ports are available in one PRB and one eCCE is configured with the size of 8 eREGs, the DeREGs are divided into two sets but two DMRSs are used in both the sets 1 and 2 to guarantee the same eCCE resource when the same number of PRBs are allocated as in Case A. Accordingly, when the terminal uses the DMRS ports 7 and 8 to receive the DeREG, the ports 7 and 8 are used in both the sets 1 and 2. The terminal-specific ports may be informed through higher layer signaling of selected according to a rule predetermined per subframe using the terminal ID or other parameters. In Case C where only the DMRS ports 7 and 8 exist in one PRB, all the DeREGs are received using ports 7 and 8. The detailed structure is described later with reference to FIGS. 8 and 9.

In the distributed transmission, the DeREG sets 1 and 2 are distinguished as shown in table 3. Method 1 is grouping the even-numbered DeREG indices as set 1 and odd-numbered DeREG indices as set 2. Method 2 is grouping, when the total number of DeREGs is _, the first half as set 1 and the last half as set 2. Method 3 is grouping alternatively by two consecutive DeREG indices as set 1 and set 2. One of these methods can be selected per PRB with an offset added to the indices defined in table 3.

In the case of configuring as described above, part 703 represents method 3. Accordingly, the transmission is performed in the order of DeREG indices 0, 1, 4, and 5 using the DMRS port 7 721 and DMRS port 8 722, and in the order of DeREG indices 2, 3, 6, and 7 using the DMRS port 9 723 and DMRS port 10 724.

Accordingly, in view of one DeREG, the first RE of the DeREG is transmitted using port 7 721 and then port 8 as denoted by reference number 725, and another DeREG is defined with the DMRS port and DeREG according to the method defined in tables 2 and 3. In the case that the transmission is made in this way, one DeREG is transmitted as distributed in one PRB through two different antennas. Accordingly, the ePDCCH comprised of a plurality of DeCCEs distributed with the DeREG of different PRBs is transmitted through two antennas in the distributed transmission mode.

At this time, the LeCCE resource of the proposed localized transmission mode and its location are defined depending on the case as shown in table 4. In Case A, LeCCE#0 is configured, among total 4 LeCCEs, in such a way of aggregating the REs used for antenna port 7 in the DeREGs of DeREG set 1 in the relationship between the DeREG and DMRS that is defined in tables 2 and 3.

LeCCE#1 is configured in such a way of aggregating the REs used for antenna port 8 in the DeREGs of DeREG set 1 in the relationship between DeREG and DMRS that is defined in tables 2 and 3. LeCCE#2 is configured in such a way of aggregating the REs used for antenna port 9 in the DeREGs of DeREG set 2 in the relationship between DeREG and DMRS that is defined in tables 2 and 3.

LeCCE#3 is configured in such a way of aggregating the REs used for antenna port 10 in the DeREGs of DeREG set 2 in the relationship between DeREG and DMRS that is defined in tables 2 and 3.

In Case B where total two LeCCEs are configured, LeCCE#0 is configured in such a way of aggregating the REs used for antenna ports 7 and 9 in the DeREGs of DeREG sets 1 and 2 in the relationship between the DeREG and DMRS that is defined in tables 2 and 3. LeCCE#1 is configured in such a way of aggregating the REs used for antenna ports 8 and 10 in the DeREGs of DeREG sets 1 and 2 in the relationship between the DeREG and DMRS that is defined in tables 2 and 3.

In Case C where total two LeCCEs are configured, LeCCE#0 is configured in such a way of aggregating the REs used for antenna port 7 in the DeREGs of DeREG sets 1 and 2 in the relationship between the DeREG and DMRS that is defined in tables 2 and 3. LeCCE#1 is configured in such a way of aggregating the REs used for antenna port 8 in the DeREGs of DeREG sets 1 and 2 in the relationship between the DeREG and DMRS that is defined in tables 2 and 3.

In the case of configuring the LeCCE resource as proposed in the respective cases, the LeCCEs for localized transmission are identical in structure in the PRB, and the base station may multiplex the different transmission modes.

Since the LeCCEs are configured based on the antenna port locations designated in the DeREG, the terminal is capable of estimating channels based on relationship between the DMRS port and DeREG transmitted therethrough regardless of the transmission mode and performing demodulation by only changing the order of the received signal depending on the mode of the corresponding ePDCCH.

In the case of arranging total 4 LeCCEs 711, 712, 713, and 714 in one PRB 701, the locations of the LeCCEs are determined as shown in part 715 according to the rule defined in table 4 in the DMRS port used in the DeREG as shown in part 703 and, at this time, if the resource is arranged as denoted by reference number 716, the resource within the same LeCCE is used for transmission with the same antenna port and thus makes it possible to perform the localized transmission. Table 5 shows the DMRS ports for transmitting LeCCE according to the respective frame configurations in the localized transmission mode. The terminal can receive LeCCEs using diverse and terminal-available DMRSs.

This configuration method is advantageous when the PRB indices sent to the terminal in different transmission modes are identical with each other. At this time, the base station may select one of the distributed transmission mode and localized transmission mode for the same PRB and, in this case, the terminal has to attempt both the two modes in the same PRB.

Since the DMRS is transmitted at the same resource location independently of the transmission mode in the proposed resource configuration method, the terminal is capable of demodulating the control channel quickly. Also, the base station can arrange the different transmission mode ePDCCHs for different terminal in the same PRB in such a way of using DeREG set 1 for transmitting ePDCCH in the distributed mode and DeREG set 2 for transmitting ePDCCH in the localized mode.

At this time, the terminal can receive its control channel regardless of the transmission mode, and the base station can design different antenna transmission schemes for transmitting different control channels in one PRB.

TABLE 1

| | Subframe case |
|---|---|
| 4ports, 4eREG (case A) | Normal subframe with normal CP Special subframe configuration 3, 4, 8 with normal CP |
| 4ports, 8eREG (case B) | Special subframe configuration 1, 2, 6, 7, 9 with normal CP |
| 2ports, 8eREG (case C) | Normal subframe with extended CP Special subframe configuration 1, 2, 3, 5, 6 with extended CP |

TABLE 2

|  | Case A | Case B | Case C |
|---|---|---|---|
| DeREG set 1 | Port 7, 8 | Port 7, 8 or Port 9, 10 | Port 7, 8 |
| DeREG set 2 | Port 9, 10 | Port 7, 8 or Port 9, 10 | Port 7, 8 |

TABLE 3

|  | DeREG set 1 | DeREG set 2 |
|---|---|---|
| Method #1 | j = Even DeREG index | j = Odd DeREG index |
| Method #2 | $j = 0 \sim \frac{N_{DeREG}^{TOT}}{2} - 1$ | $j = \frac{N_{DeREG}^{TOT}}{2} \sim N_{DeREG}^{TOT} - 1$ |
| Method #3 | For $i = 0, \ldots, N_{DeREG}^{TOT} - 1$, $j = 4 \times i + 0$ and $4 \times i + 1$ End | For $i = 0, \ldots, N_{DeREG}^{TOT} - 1$, $j = 4 \times i + 2$ and $4 \times i + 3$ End |
| Method #4 | For $i = 0, \ldots, N_{DeREG}^{TOT} - 1$, $j = 4 \times i + 0$ and $4 \times i + 2$ End | For $i = 0, \ldots, N_{DeREG}^{TOT} - 1$, $j = 4 \times i + 1$ and $4 \times i + 3$ End |

TABLE 4

|  | Case A | Case B | Case C |
|---|---|---|---|
| LeCCE#0 | Set of REs used for port 7 in DeREG set 1 | Set of REs used for port 7 in DeREG sets 1 and 2 and set of REs used for port 9 in DeREG sets 1 and 2 | Set of REs used for port 7 in DeREG sets 1 and 2 |
| LeCCE#1 | Set of REs used for port 8 in DeREG set 1 | Set of REs used for port 8 in DeREG sets 1 and 2 and set of REs used for port 10 in DeREG sets 1 and 2 | Set of REs used for port 8 in DeREG sets 1 and 2 |
| LeCCE#2 | Set of REs used for port 9 in DeREG set 2 | NA | NA |
| LeCCE#3 | Set of REs used for port 10 in DeREG set 2 | NA | NA |

TABLE 5

|  | Case A | Case B | Case C |
|---|---|---|---|
| LeCCE#0 | Port 7 | Port 7 or Port 9 | Port 7 |
| LeCCE#1 | Port 8 | Port 8 or Port 10 | Port 8 |
| LeCCE#2 | Port 9 | NA | NA |
| LeCCE#3 | Port 10 | NA | NA |

Figure 8A:
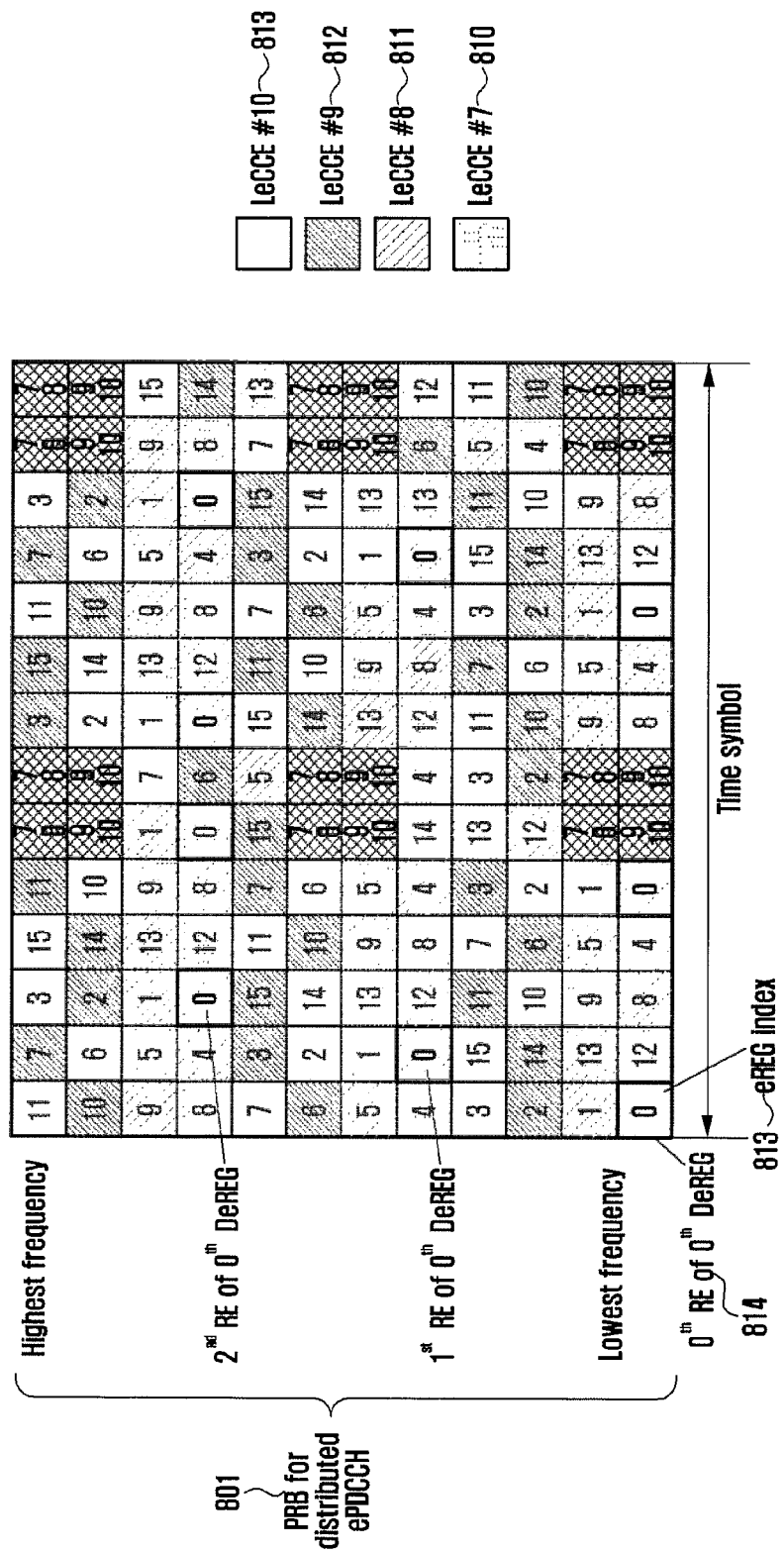
FIGS. 8a to 8c are diagrams illustrating the resource allocation structures of the distributed control channel mode proposed by the present invention.
Figure 8B:
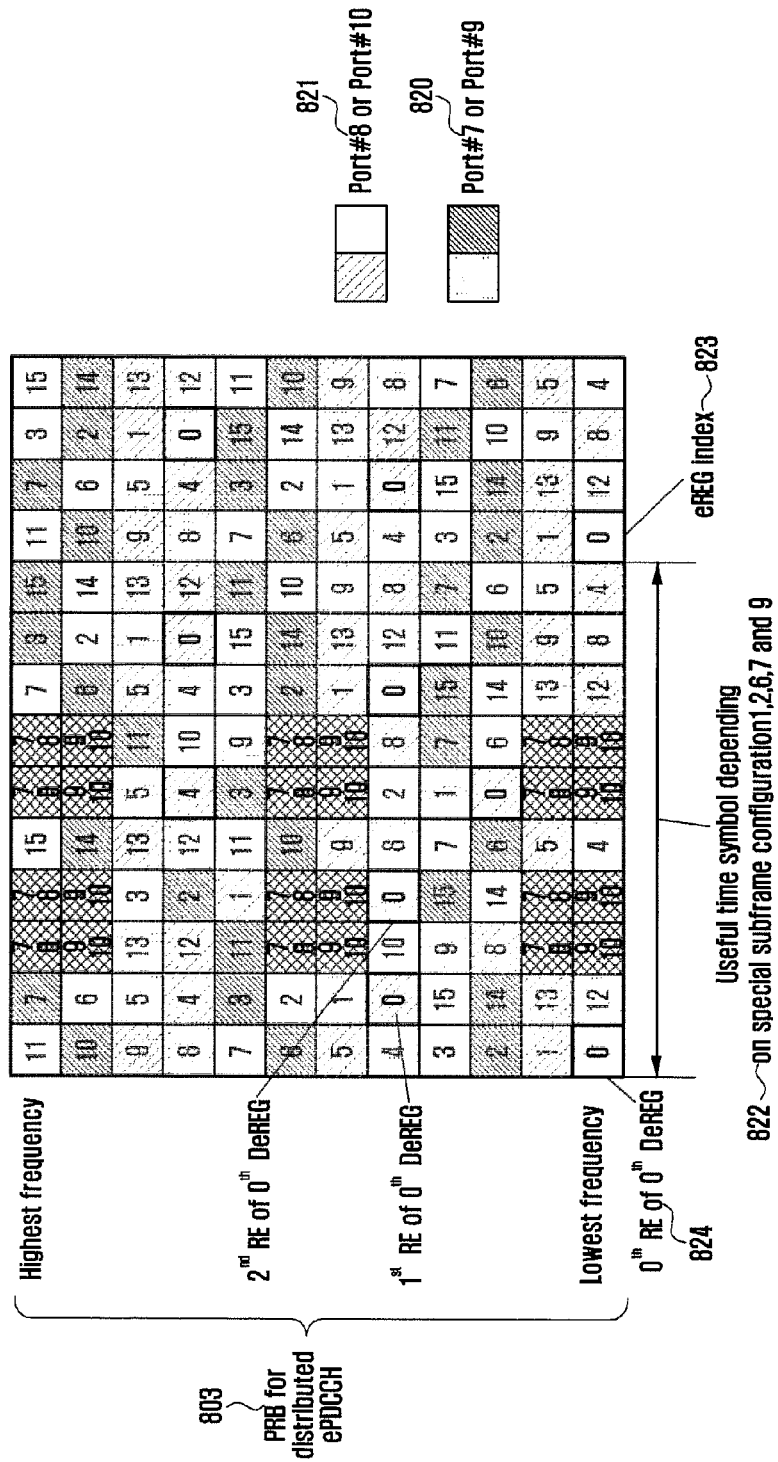
Figure 8C:
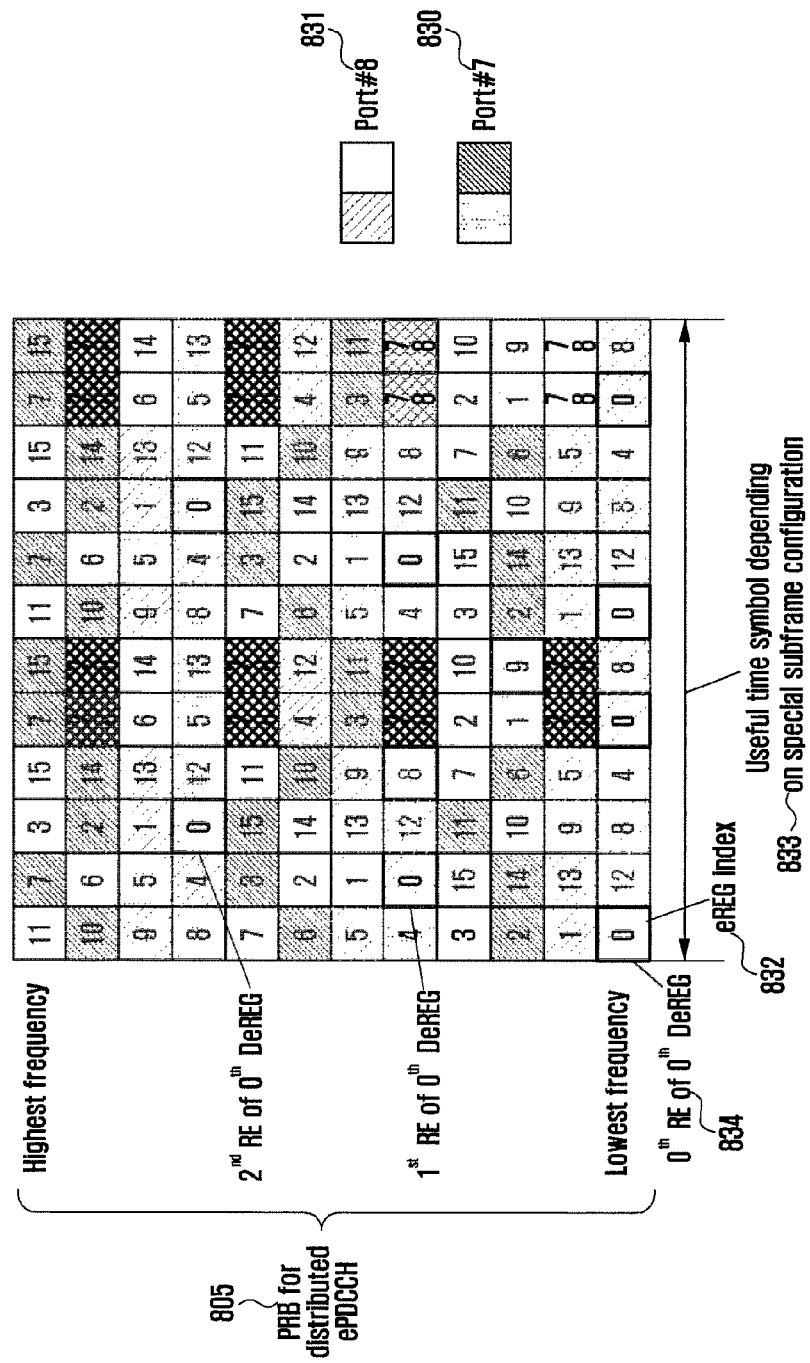

FIG. 8 is diagrams illustrating detailed methods of distributed modes according to the respective cases of table 1. Referring to FIG. 8, FIG. 8a shows case A, FIG. 8b case B, and FIG. 8c case C.

FIG. 8a is directed to the case of using total 4 DMRSs 810, 811, 812, and 813 where each DeREG 813 uses two different DMRSs.

In the case of FIG. 8b where the number of symbols that can be used actually is different from that of FIG. 8a, the numbers of DMRSs for ports 820 and 821 are identical with each other but located differently, and the DeREG 823 uses two different DMRSs. It is different from FIG. 8a that the two different DMRS can be sued simultaneously in sets 1 and 2 depending on the terminal.

FIG. 8c shows the extended CP subframe structure in which the number of available symbols may vary as denoted by reference number 833 unlike FIGS. 8a and 8b. In the subframe of FIG. 8c, up to 2 DMRS can be used as denoted by reference numbers 830 and 831, and each DeREG 832 is transmitted using two different antenna ports and, the difference from FIGS. 8a and 8b is that sets 1 and 2 are received through the same antenna port.

FIG. 9 is a diagram illustrating LeCCE configuration methods in the case that the DeREG and DMRS are defined as in FIGS. 8a, 8b, and 8c.

Figure 9A:
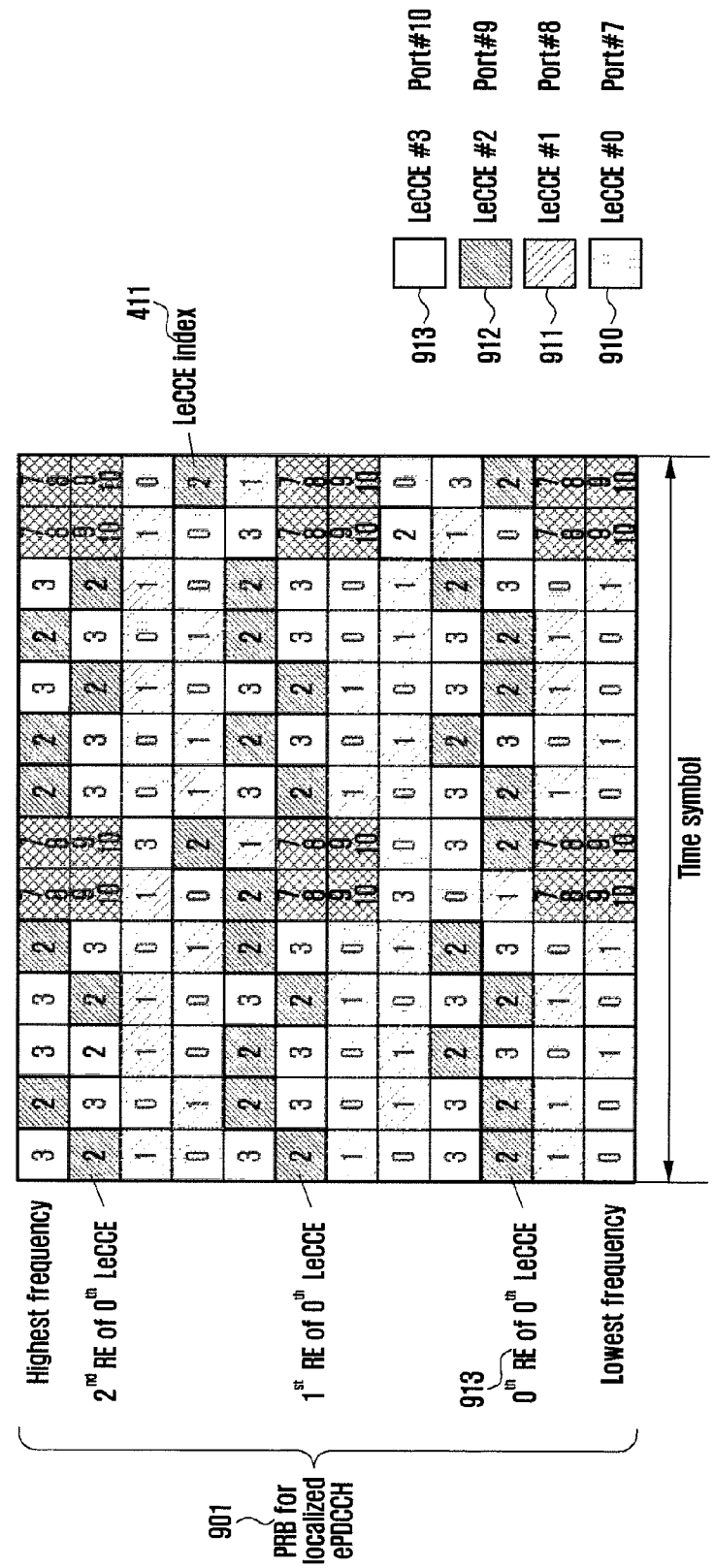
FIGS. 9a to 9c are diagrams illustrating the resource allocation structures of the localized control channel mode proposed by the present invention.

Referring to FIG. 9, FIG. 9a shows the LeCCE configuration according to a rule of table 4 in the relationship defined with method 3 of table 3 in FIG. 8a. In this case, the resource 810 in set 1 of FIG. 8a corresponds to LeCCE#0 910 and the resource 811 in set 1 corresponds to LeCCE#1 911.

Figure 9B:
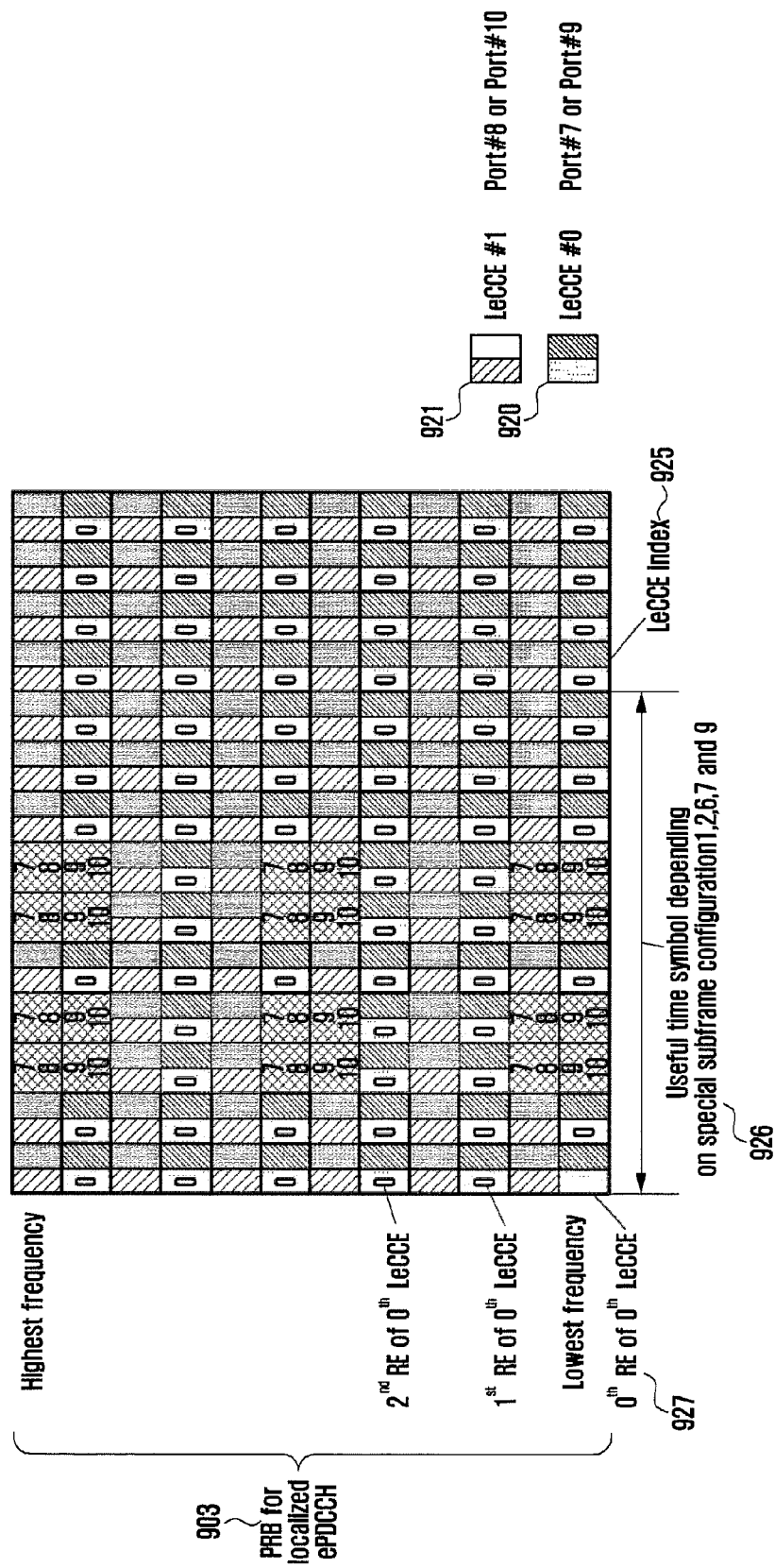

FIG. 9b shows a method of configuring the LeCCE using the relationship defined in FIG. 8b. In FIG. 8b, the antenna ports 7 and 8 are aggregated to configure one LeCCE 925.

Figure 9C:
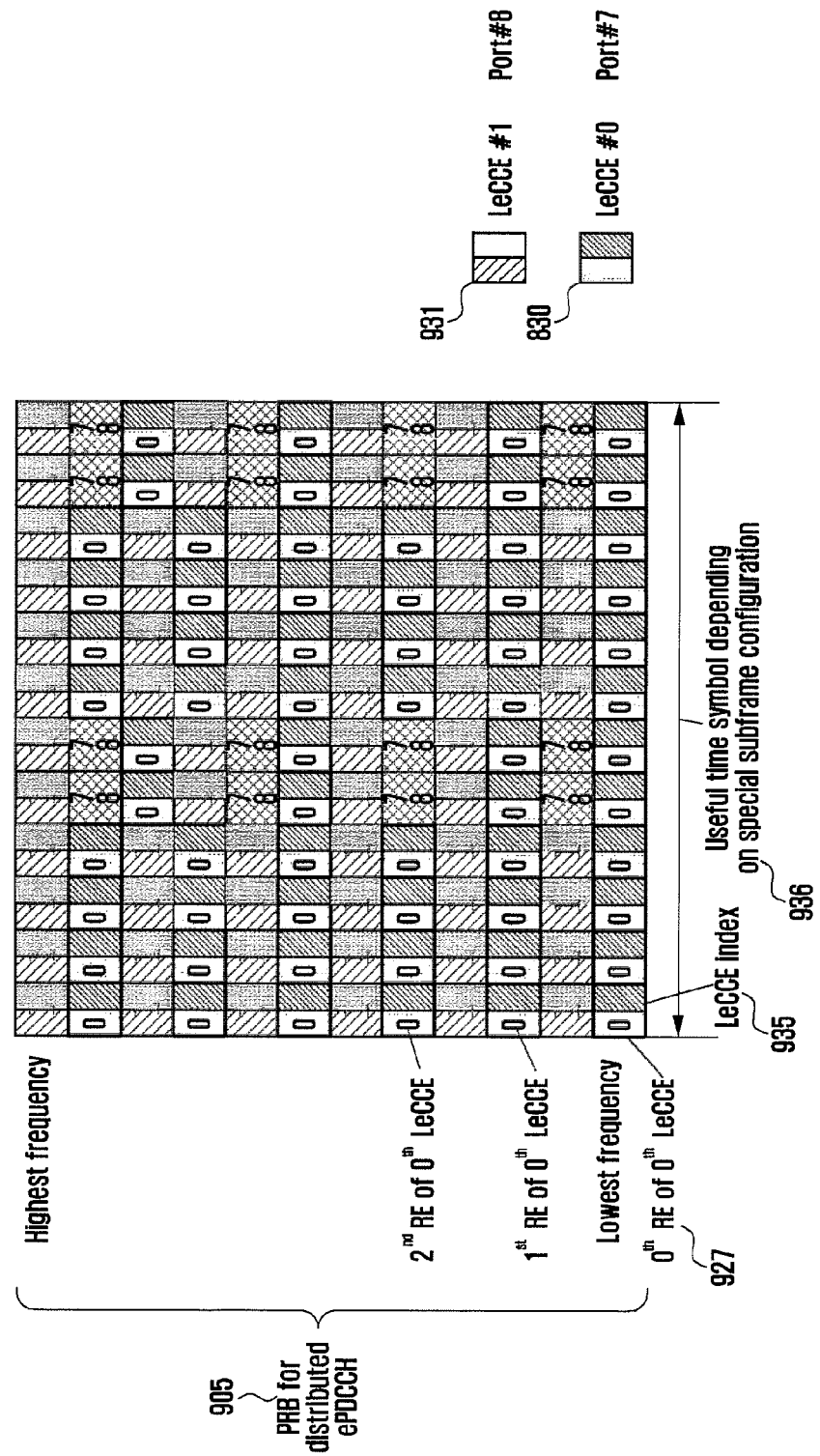

FIG. 9c shows the LeCCE configuration based on the relationship defined in FIG. 8c. In FIG. 8c, the antenna port 7 is aggregated to configure the LeCCE 930.

Figure 10:
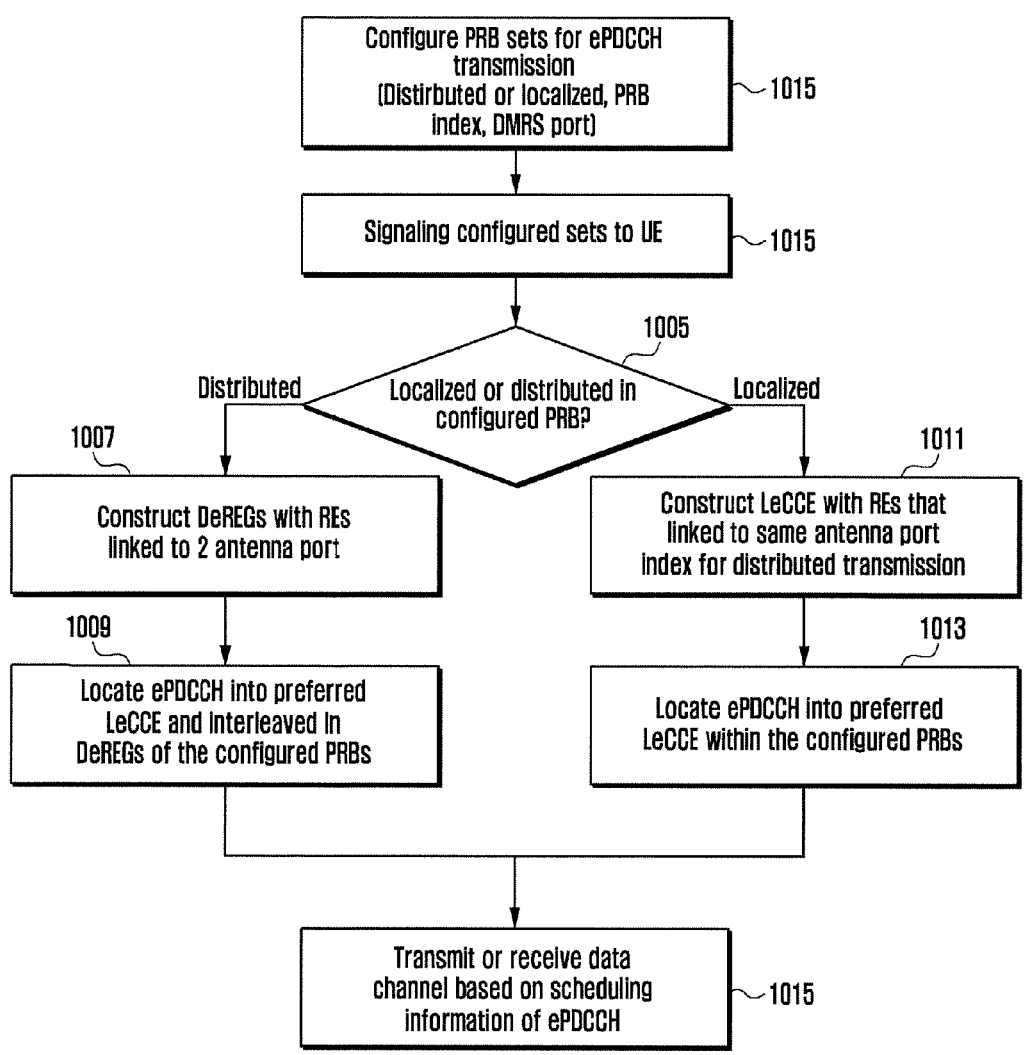
FIG. 10 is a flowchart illustrating the base station operation according to an embodiment of the present invention.

FIG. 10 is a flowchart illustrating an ePDCCH allocation procedure of a base station according to an embodiment of the present invention.

Referring to FIG. 10, the base station sends the terminal at least one resource configuration information for ePDCCH at step 1001. The resource configuration information includes the information on the transmission mode or transmission PRB resource. It also may include the information on the DMRS port.

The base station sends the terminal the information configured as above at step 1003 and, in the case of transmitting the control channel afterward, the base station determines the transmission mode of the corresponding PRB at step 1005.

If the transmission mode is the distributed transmission mode, the base station configure the resource per subframe according to the DeREG configuration method proposed in tables 2 and 3 of the present invention at step 1005 and, otherwise the transmission is the localized transmission mode, configures the location of the LeCCE as in table 4 based on the resource configured in tables 2 and 3 at step 1011.

If it is required to perform transmission with different transmission modes in one PRB, the resource is configured appropriately for the respective modes and allocated without overlap in one PRB as described above.

The control channel resource configured as above is distributed in all PRBs in which ePDCCH is distributed in unit of DeREG at step 1009 such that the terminal receives the distributed DeREG inversely by distributing according to a predetermined rule.

In the case of the localized transmission, the control channel is arranged in the search space for the terminal at step 1013 in order for the terminal to receive. Next, the base station transmits the downlink channel or receive the uplink channel based on the scheduling information carried in the corresponding control channel.

Figure 11:
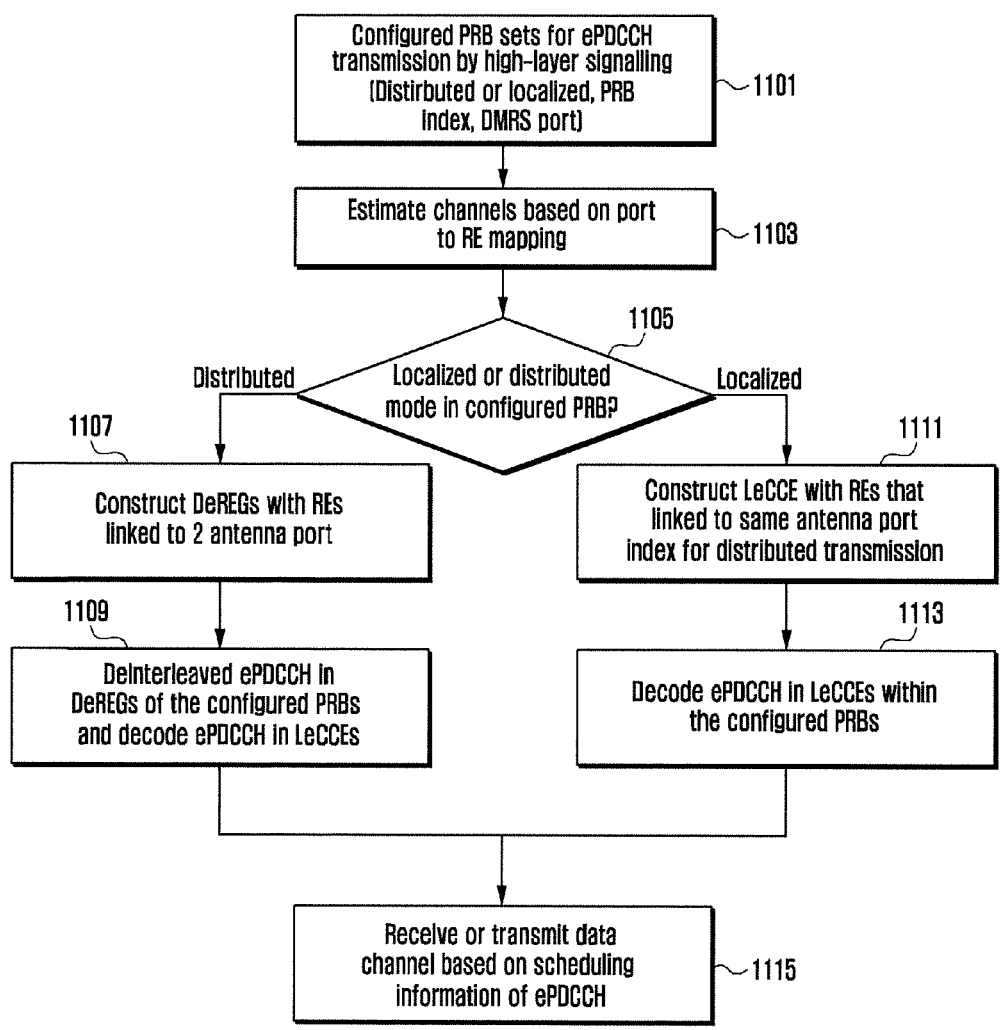
FIG. 11 is a flowchart illustrating the terminal operation according to an embodiment of the present invention.

FIG. 11 is a flowchart illustrating the terminal operation according to an embodiment of the present invention. Referring to FIG. 11, the terminal receives a plurality of configuration information for receiving ePDCCH from the base station, each configuration information including at least one of transmission mode, PRB configuration information, and candidate DMRS ports required for receiving ePDCCH at step 1101.

Upon receipt of the configuration informations, the terminal estimates channels per DMRS in the corresponding PRB based on tables 2, 3, and 4 at step 1103. Since it is possible to estimate channel regardless of the transmission mode of ePDCCH due to the effect of the present invention, the terminal is capable of acquire the channel estimation information in advance.

If the transmission mode for the corresponding PRB is the distributed transmission mode at step 1105, the terminal configures the DeREG at the resource locations in the PRB along with the estimated channel information at step 1107 and, otherwise if the transmission mode is the localized transmission mode, the terminal configures the local transmission resource at step 1111, and receives its control channel in the terminal-specific search space as described above at step 1109 and 1113. Next, the terminal receives or transmits data channel based on the received control channel information at step 1115.

Figure 12:
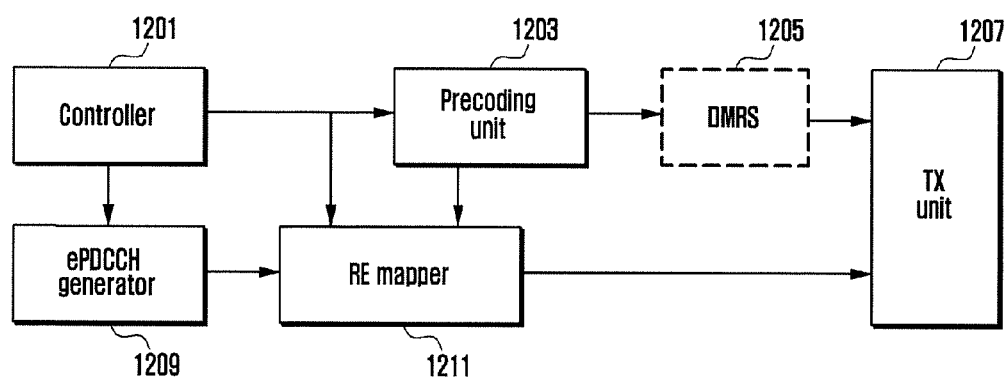
FIG. 12 is a block diagram illustrating a configuration of the base station according to an embodiment of the present invention.

FIG. 12 is a block diagram illustrating a configuration of the base station according to an embodiment of the present invention. Referring to FIG. 12, the base station controller 1201 proposed in the present invention controls the control channel generator 1209 to generate the control channels for different modes and controls the RE mapper 1211 to determine the positions of DeREG and LeCCE. Depending on the transmission mode, the precoder 1203 determines the channel transmission beam on the respective resources and transmits the beam to the terminal along with the DMRS 1205 by means of the Tx unit 1207.

Figure 13:
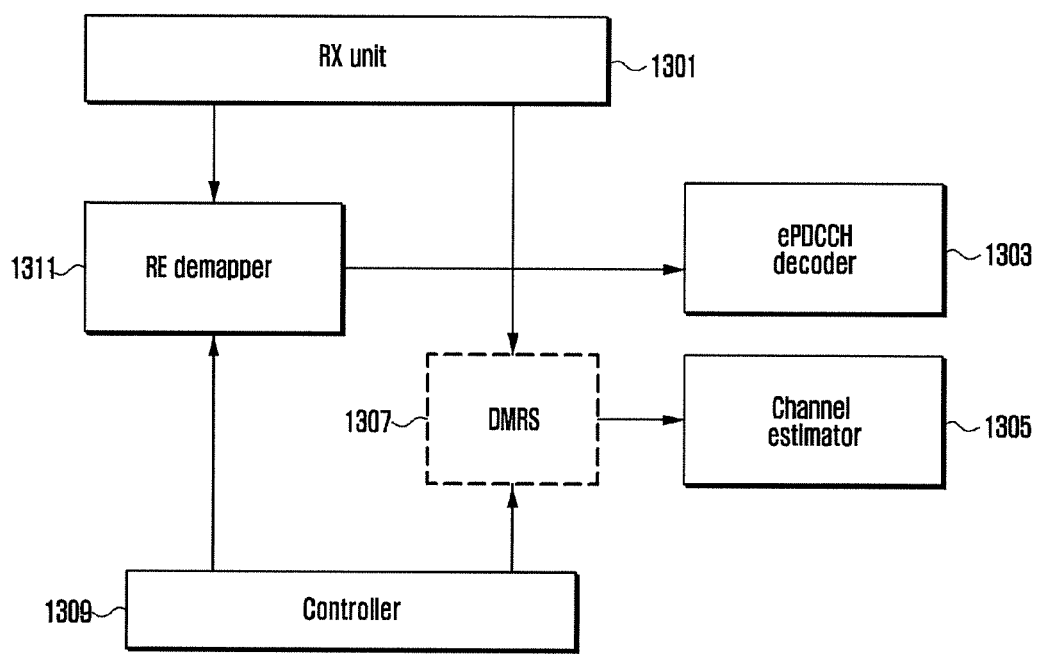
FIG. 13 is a block diagram illustrating a configuration of the terminal according to an embodiment of the present invention.

FIG. 13 is a block diagram illustrating a configuration of the terminal according to an embodiment of the present invention. Referring to FIG. 13, the RX unit 1301 receives DMRS 1307, the channel estimator 1305 estimates channels based on the DMRS, and the terminal controller 1309 configures, when the control channel for a transmission mode is received, the resource by means of the demappers 1311. The terminal receives the control channels through decoding by means of the decoder 1303 based on the channel estimated by the estimator 1305 and the transmission mode.

The invention claimed is:

1. A method implemented using a base station to transmit control information in a wireless communication system, the method comprising:
   configuring a physical resource block (PRB) with one or more distributed enhanced resource element groups (DeREGs), wherein each of DeREGs comprises a same number of resource elements that are mapped to at least two demodulated reference signal (DMRS) ports in a distributed transmission mode;
   configuring the PRB with one or more localized enhanced control channel elements (LeCCEs) comprising resource elements using a same DMRS port among the at least two DMRS ports mapped to the resource elements of each of the DeREGs in a localized transmission mode; and
   transmitting the control information using the PRB to a terminal.

2. The method of claim 1, further comprising transmitting PRB configuration information to transmit the control information to the terminal, wherein the PRB configuration information includes at least one of a transmission mode and a PRB index.

3. The method of claim 2, wherein configuring the PRB with the DeREGs comprises configuring, when four DMRS ports are available and up to four DeREGs are configurable in the PRB, the PRB by mapping a first DeREG set to DMRS ports 7 and 8 and a second DeREG set to DMRS ports 9 and 10.

4. The method of claim 3, wherein configuring the PRB with the one or more LeCCEs comprises:
   configuring a first LeCCE by aggregating resources using the DMRS port 7 in the first DeREG set, a second LeCCE by aggregating resources using the DMRS port 8 in the first DeREG set, a third LeCCE by aggregating resources using the DMRS port 9 in the second DeREG set, and a fourth LeCCE by aggregating resources using the DMRS port 10 in the second DeREG set; and
   configuring the PRB by arranging the first, second, third, and fourth LeCCEs.

5. The method of claim 3, wherein configuring the PRB with the one or more LeCCEs comprises:
   configuring a first LeCCE by aggregating resources using the DMRS port 7 or 9 in first and second DeREG sets and configuring a second LeCCE by aggregating resources using the DMRS port 8 or 10 in the first and second DeREG sets; and
   configuring the PRB by arranging the first and second LeCCEs.

6. The method of claim 3, wherein configuring the PRB with the one or more LeCCEs comprises:
   configuring a first LeCCE by aggregating resources using the DMRS port 7 in first and second DeREG sets and configuring a second LeCCE by aggregating resources using the DMRS port 8 in the first and second DeREG sets; and
   configuring the PRB by arranging the first and second LeCCEs.

7. The method of claim 2, wherein configuring the PRB with the DeREGs comprises configuring, when four DMRS ports are available and up to 8 DeREGs are configurable in the PRB, the PRB by mapping a first DeREG set and a second DeREG set to DMRS ports 7 and 8 or mapping the first DeREG set and the second DeREG set to DMRS ports 9 and 10.

8. The method of claim 2, wherein configuring the PRB with the DeREGs comprises configuring, when four DMRS ports are available and up to 8 DeREGs are configurable in the PRB, the PRB by mapping all DeREG sets to DMRS ports 7 and 8.

9. A method implemented using a terminal to receiving a control information in a wireless communication system, the method comprising:
   estimating a channel per demodulated reference signal (DMRS) port of the terminal;
   receiving a physical resource block (PRB) configured with one or more distributed enhanced resource element groups (DeREGs), wherein each of DeREGs comprises a same number of resource elements that are mapped to at least two DMRS-ports in a distributed transmission mode; and
   receiving, in a localized transmission mode, the PRB comprising one or more localized control channel elements (LeCCEs) comprising resource elements using a same DMRS port among the at least two DMRS ports mapped to the resource elements of each of the DeREGs.

10. The method of claim 9, further comprising receiving PRB configuration information to transmit the control information from a base station, wherein the PRB configuration information comprises at least one of a transmission mode and a PRB index.

11. The method of claim 10, wherein receiving the PRB comprises receiving, when four DMRS ports are available and up to four DeREGs are configurable in the PRB, a first DeREG set through DMRS ports 7 and 8 and a second DeREG set through DMRS ports 9 and 10.

12. The method of claim 10, wherein receiving the PRB comprises receiving, when four DMRS ports are available and up to 8 DeREGs are configurable in the PRB, a first DeREG set and a second DeREG set through DMRS ports 7 and 8 or DMRS ports 9 and 10.

13. The method of claim 10, wherein receiving the PRB comprises receiving, when four DMRS ports are available and up to 8 DeREGs are configurable in the PRB, all DeREG sets through DMRS ports 7 and 8.

14. A base station to transmit control information channel in a wireless communication system, wherein the base station comprises a controller configured to:
control a transceiver to transmit and receive signals to and from a terminal;
configure a physical resource block (PRB) with one or more distributed enhanced resource element groups (DeREGs), wherein each of DeREGs comprises a same number of resource elements that are mapped to at least two demodulated reference signal (DMRS) ports in a distributed transmission mode;
configure the PRB with one or more localized enhanced control channel elements (LeCCEs) comprising resource elements using a same DMRS port among the at least two DMRS ports mapped to the resource elements of each of the DeREGs in a localized transmission mode; and
transmit the control information to a terminal using the PRB.

15. The base station of claim 14, wherein the controller is configured to control a transmission of PRB configuration information to transmit the control information to the terminal, and wherein the PRB configuration information comprises at least one of a transmission mode and a PRB index.

16. The base station of claim 15, wherein the controller is configured to control a configuration of, when four DMRS ports are available and up to four DeREGs are configurable in the PRB, the PRB by mapping a first DeREG set to DMRS ports 7 and 8 and a second DeREG set to DMRS ports 9 and 10.

17. The base station of claim 15, wherein the controller is configured to control a configuration of, when four DMRS ports are available and up to 8 DeREGs are configurable in the PRB, the PRB by mapping a first DeREG set and a second DeREG set to DMRS ports 7 and 8 or mapping the first DeREG set and the second DeREG set to DMRS ports 9 and 10.

18. The base station of claim 15, wherein the controller is configured to control a configuration of, when four DMRS ports are available and up to 8 DeREGs are configurable in the PRB, the PRB by mapping all DeREG sets to DMRS ports 7 and 8.

19. A terminal to receive control information in a wireless communication system, the terminal comprising:
a channel estimator configured to estimate a channel per demodulated reference signal (DMRS) port;
a transceiver; and
a controller configured to:
control the transceiver to receive a physical resource block (PRB) configured with one or more distributed enhanced resource element groups (DeREGs), wherein each of DeREGs comprises a same number of resource elements that are mapped to at least two demodulated reference signal (DMRS) ports in a distributed transmission mode;
control the transceiver to receive, in a localized transmission mode, the PRB comprising one or more localized enhanced control channel elements (LeCCEs) comprising resource elements using a same DMRS port among the at least two DMRS ports mapped to the resource elements of each of the DeREGs; and
control the transceiver to transmit and receive signals to and from a base station.

20. The terminal of claim 19, wherein the controller is configured to control a reception of PRB configuration information to transmit the control information from the base station, wherein the PRB configuration information comprises at least one of a transmission mode and a PRB index.

21. The terminal of claim 20, wherein the controller is configured to control a reception of, when four DMRS ports are available and up to four DeREGs are configurable in the PRB, a first DeREG set through DMRS ports 7 and 8 and a second DeREG set through DMRS ports 9 and 10.

22. The terminal of claim 20, wherein the controller is configured to control a reception of, when four DMRS ports are available and up to 8 DeREGs are configurable in the PRB, a first DeREG set and a second DeREG set through DMRS ports 7 and 8 or DMRS ports 9 and 10.

23. The terminal of claim 20, wherein the controller is configured to control a reception of, when four DMRS ports are available and up to 8 DeREGs are configurable in the PRB, all DeREG sets through DMRS ports 7 and 8.

* * * * *